United States Patent [19]

Werner

[11] 4,139,645

[45] Feb. 13, 1979

[54] COLORING AGENTS FOR EDIBLE MATERIALS

[75] Inventor: Raymond E. Werner, Cincinnati, Ohio

[73] Assignee: Sterling Drug Inc., New York, N.Y.

[21] Appl. No.: 823,801

[22] Filed: Aug. 11, 1977

[51] Int. Cl.$^2$ .............................................. A23L 1/275
[52] U.S. Cl. .................... 426/250; 426/540; 426/576; 426/590
[58] Field of Search ............... 426/250, 540, 590, 576, 426/591, 599

[56] References Cited

U.S. PATENT DOCUMENTS

| | | | |
|---|---|---|---|
| 1,388,174 | 8/1921 | Denny .................................. | 426/540 |
| 2,535,538 | 12/1950 | Koch .................................... | 426/540 |
| 2,841,499 | 7/1958 | Grossi .................................. | 426/250 |
| 3,425,841 | 2/1969 | Handwerk et al. ................... | 426/540 |
| 3,483,002 | 12/1969 | Stein .................................... | 426/540 |
| 3,655,406 | 4/1972 | Klaui .................................... | 426/540 |
| 3,734,745 | 5/1973 | Cassanelli ............................ | 426/250 |
| 3,792,182 | 2/1974 | Carpigiani ........................... | 426/250 |

OTHER PUBLICATIONS

Certified Food Colors, Warner–Jenkinson Manufacturing Co., 1969, pp. 20–23, 46, 35–38.

*Primary Examiner*—Jeanette M. Hunter
*Attorney, Agent, or Firm*—Lynn T. Fletcher; B. Woodrow Wyatt

[57] ABSTRACT

This invention relates to a method for imparting a red hue to edible materials by incorporating a stabilized solid solution consisting essentially of FD & C Red No. 3 and edible gelatin; to said solid solutions; to edible materials colored with the solid solution and to the process for preparing the solid solutions.

10 Claims, No Drawings

COLORING AGENTS FOR EDIBLE MATERIALS

BACKGROUND OF THE INVENTION (a) Field of the Invention

This invention relates to the field of edible materials and more particularly to a novel method of imparting a red hue to edible materials by incorporating a stabilized solid solution consisting of FD & C Red No. 3 and edible gelatin; to edible materials colored with stabilized solid solutions consisting essentially of FD & C Red No. 3 and edible gelatin; to stabilized solid solutions consisting essentially of FD & C Red No. 3 and edible gelatin useful as a dyestuff for edible materials, particularly edible materials containing acids; and to the process for preparing said stabilized solid solutions.

(b) Description of the Prior Art

Many of the colors previously employed for lending a red hue to edible foodstuffs and beverages have been only provisionally accepted for safe use by the government agencies which control the use and application of such materials. The availability of water-soluble bluish-red colored organic dyestuffs for use in edible compositions has been greatly restricted since FD & C Red No. 2 has been removed from the approved listed food colors. Currently, there exist two red-colored synthetic dyestuffs to be used in edible foodstuffs. One is FD & C Red No. 40 which is yellowish-red in shade. The second is FD & C Red No. 3 which is bluish-red in shade. The certified color, FD & C Red No. 3 (erythrosine), is known to possess considerable stability in the presence of ascorbic acid and presumably might function effectively as a coloring agent in acidic media. However, it has long been recognized by color chemists that this dye is insoluble in aqueous acid solutions at a pH below 4.2. Generally, FD & C Red No. 3 has not been used to color edible materials which are considered strongly acid, that is with a pH of less than 4.2, for example, gelatin desserts and fruit-flavored beverages both carbonated and non-carbonated. Thus, there is a need for a bluish-red dyestuff which possesses stability in solutions having acid strengths of less than 4.2 pH units. It surprisingly has been found that the stabilized solid solutions of the instant invention consisting essentially of FD & C Red No. 3 and edible gelatin possess the desired ability to exhibit strong tinctorial strengths in acid mixtures where the pH values are less than 4.2.

The following items, to date, appear to constitute the most relevant prior art with regard to the instant invention.

U.S. Pat. No. 3,425,841, which issued Feb. 4, 1969, discloses the use of FD & C Red No. 3 to impart a selected color to a blend of pineapple and grapefruit juices having a pH of between 3.1 and 4.2. The blend is described as usually containing citric and ascorbic acids in addition to the natural acidic components of the blend.

U.S. Pat. No. 3,483,002, which issued Dec. 9, 1969, discloses the use of FD & C Red No. 3 in tablets of gelatinous coloring compositions which include sugar, gelatin, gum arabic and hydrogenated vegetable shortening. The tablets are described as a medium for the transfer of color and flavor into foods, confections and the like.

U.S. Pat. No. 1,172,113, issued Feb. 16, 1916, discloses a process for producing coloring tablets for candy which consists of concentrating a solution of sugar, gelatin and a color soluble in said solution until the composition may be formed into tablets.

Cooper, Ansel and Cadwallader in the Journal of Pharmaceutical Sciences, 1973, 62(7), 1156–64 describe the use of eight FD & C dyes, including FD & C Red No. 3 for coloring pharmaceutical gelatin of the type used for preparing capsules. This paper, in particular, treats of the effects of the dyes on the disintegration behavior of the gelatins.

SUMMARY OF THE INVENTION

The present invention in its method of use aspect provides a method of imparting a red hue to edible materials which comprises incorporating into said edible materials in an amount effective to impart the desired red color, a stabilized solid solution consisting essentially of FD & C Red No. 3 and edible gelatin.

In its composition of matter aspect, the invention relates to stabilized solid solutions consisting essentially of FD & C Red No. 3 and edible gelatin.

In its colored edible materials aspect, the invention relates to edible materials which have incorporated therein stabilized solid solutions consisting essentially of FD & C Red No. 3 and edible gelatin to impart the desired red hue.

In its process aspect, the invention relates to a process for preparing stabilized solid solutions consisting essentially of FD & C Red No. 3 and edible gelatin which comprises dissolving the FD & C Red No. 3 and gelatin in water, evaporating the solution to dryness and comminuting the residual solid solution to the desired particle size.

DETAILED DESCRIPTION INCLUSIVE OF THE PREFERRED EMBODIMENTS

More specifically, in its method of use aspect, the invention sought to be patented resides in a method of imparting a red hue to edible materials which comprises incorporating into said edible materials, in an amount effective to impart red hue thereto, as a coloring agent, a stabilized solid solution consisting essentially of 0.1 to 40 percent by weight of the solution of FD & C Red No. 3 and 99.9 to 60 percent by weight of the solution of edible gelatin, said solid solution optionally containing in addition to the FD & C Red No. 3 and gelatin sufficient amounts of edible colorants selected from the group consisting of FD & C Blue No. 1, FD & C Blue No. 2, FD & C Yellow No. 5 and FD & C Yellow No. 6 to impart a desired shade of red hue to said edible materials.

This invention, in its composition of matter aspect, resides in the novel stabilized solid solutions as coloring agents for imparting a red hue to edible materials, consisting essentially of 0.1 to 40 percent by weight of the solution of FD & C Red No. 3 and 99.9 to 60 percent by weight of the solution of edible gelatin, said solid solution optionally containing in addition to the FD & C Red No. 3 and gelatin sufficient amounts of edible colorants selected from the group consisting of FD & C Blue No. 1, FD & C Blue No. 2, FD & C Yellow No. 5 and FD & C Yellow No. 6 to impart a desired shade of red hue to said edible materials.

In a first particular embodiment in accordance with its composition of matter aspect, the invention sought to be patented resides in the novel stabilized solid solutions consisting of 0.1 to 30 percent by weight of the solution of FD & C Red No. 3 and 99.9 to 70 percent by weight of edible gelatin.

In a second particular embodiment in accordance with its composition of matter aspect, the invention sought to be patented resides in the novel solid stabilized solutions consisting of 0.1 to 30 percent by weight of the solution of FD & C Red No. 3, 0.1 to 5 percent by weight of the solution of FD & C Blue No. 1 and 99.8 to 65 percent by weight of the solution of edible gelatin.

This invention, in its colored edible materials aspect, resides in novel colored edible materials which comprise edible materials and as coloring agents stabilized solid solutions consisting essentially of 0.1 to 40 percent by weight of the solution of FD & C Red No. 3 and 99.9 to 60 percent by weight of the solution of edible gelatin, said solid solution optionally containing in addition to the FD & C Red No. 3 and gelatin sufficient amounts of edible colorants selected from the group consisting of FD & C Blue No. 1, FD & C Blue No. 2, FD & C Yellow No. 5 and FD & C Yellow No. 6 to impart a desired shade of red hue to said edible material.

This invention, in its process aspect, resides in the novel process for preparing a stabilized solid solution consisting essentially of 0.1 to 40 percent by weight of FD & C Red No. 3 and 99.9 to 60 percent by weight of the solution of edible gelatin, said solid solution optionally containing in addition to the FD & C Red No. 3 and gelatin sufficient amounts of edible colorants selected from the group consisting of FD & C Blue No. 1, FD & C Blue No. 2, FD & C Yellow No. 5 and FD & C Yellow No. 6 which comprises: (a) dissolving the edible gelatin in water; (b) dissolving the FD & C Red No. 3 and optionally one or more of the other shades imparting edible colorants in the gelatin-water solution; (c) evaporating the water from the gelatin-FD & C Red No. 3-water solution; and (d) comminuting the residual stabilized gelatin-FD & C Red No. 3 solid solution to the desired particle size.

As used herein, the term "FD & C Red No. 3" is the bluish-red dyestuff certified by the United States Food and Drug Administration for use in food, drugs and cosmetics and given the designated Red No. 3. Another common name for the dyestuff is erythrosine. Red No. 3 is listed in the Colour Index by Number 45430 and has the chemical name disodium 2,4,5,7 tetraiodofluorescein (Chemical Abstracts Registry Number 568-63-8) having the chemical structure

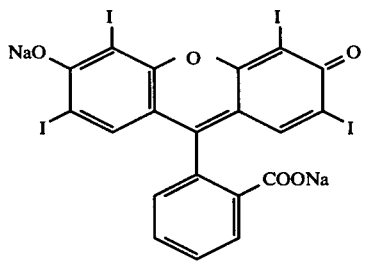

As used herein, the term "gelatin" refers to any type of edible gelatin listed by the United States Food and Drug Administration as being acceptable for use in foods and drugs. Thus, a variety of types of edible gelatins, for example, gelatins of any Bloom number, type A (acid processed) gelatin and type B (alkaline processed) gelatin are useful in the preparation of the gelatin-FD & C Red No. 3 solid solutions of this invention.

As used herein, the term "stabilized solid solution" refers to a solidified solution of FD & C Red No. 3 dissolved in gelatin which exhibits a high degree of stability in the presence of acid-containing foodstuffs and beverages as discussed in greater detail hereinbelow.

As used in this application, the term "edible colorants" means colors certified by the United States Food and Drug Administration for use in foodstuffs and drugs and in addition to FD & C Red. No. 3, includes FD & C Blue No. 1, FD & C Blue No. 2, FD & C Yellow No. 5 and FD & C Yellow No. 6.

The term "gelatin dessert and/or gelatin dessert mix" is used herein to refer to the commercial fruit flavored gelatin desserts commonly sold in the retail market. Generally, these are composed of sugar, gelatin, acids, flavoring, coloring agents and various preservatives and stabilizers. The dessert mix, when dissolved in water, will generally produce a solution having a pH of 4.1 or lower.

The novel coloring agents of this invention are stabilized solid solutions consisting essentially of FD & C Red No. 3 and edible gelatin which are obtained by dissolving in a first step, the gelatin in water, followed by slowly dissolving, in a second step, the FD & C Red No. 3 in the resultant aqueous gelatin solution. The aqueous solution is then evaporated to dryness and the residual stabilized solid solution of FD & C Red No. 3 in gelatin is ground to the desired particle size range. Optionally, in the second step, other edible colorants, particularly those selected from the group consisting of FD & C Blue No. 1, FD & C Blue No. 2, FD & C Yellow No. 5 and FD & C Yellow No. 6 may be incorporated to produce the desired shade of red hue needed, for example, grape or cherry color, for a specific edible material.

The instant novel stabilized solid solutions consisting of FD & C Red No. 3 and edible gelatin provide various shades of red hue making them useful for application as food and beverage coloring agents. In these applications, they are admixed in an effective, color-imparting amount with an edible material or edible material precursor, for example, a beverage concentrate or gelatin dessert powder. Generally, in such applications, it is necessary to add from 1 to 300 parts per million of a FD & C color on a pure color weight basis to achieve the desired color levels. However, as would be expected, the solid solutions of this invention have a reduced tinctorial strength compared to the corresponding dye and are effectively used to impart color in the range of from 1 to 300,000 parts per million to approximate the pure color use levels.

The stabilized solid solutions are used as coloring agents for edible materials in essentially the same manner as are other food coloring agents known in the art. Thus, they can be incorporated into the edible material as a finely divided powder in a dry blending operation; as a finely divided powder into a liquid to form a color concentrate solution; or, if desired, they can be reconstituted as an aqueous solution which may then be used to impart color to an edible material. A typical example of a dry blending application is the incorporation of the solid solution into uncolored gelatin dessert mix base as the coloring agent. The resulting colored mix, when prepared in the normal manner, produces a clear, colored gelatin dessert. In another example of utility, the finely divided solid solution powder may be dissolved in simple-syrup solutions to prepare colored concentrates for use in the manufacture of carbonated beverages. In still another example of utility, the stabilized solid solution may be dissolved in a liquid, for example, water and then the colored solution added to the edible material as the coloring agent.

The solid solutions of FD & C Red No. 3 in gelatin of the instant invention are characterized by a surprisingly and unexpectedly high degree of stability to natural acids found in foodstuffs and to acids commonly used by the food industry in the preparation of such edible materials as fruit flavored gelatin desserts, carbonated fruit flavored soft drinks and non-carbonated fruit flavored beverages. Heretofore FD & C Red No. 3 has had little or no use in coloring acid-containing edible materials where the pH of the food product is below 5.0. The only foodstuff application which appears to be known where FD & C Red No. 3 is said to be stable at low pH is that described in hereinabove discussed U.S. Pat. No. 3,425,841 which teaches the use of FD & C Red No. 3 in coloring a pineapple-grapefruit drink.

Generally, when FD & C Red No. 3 is incorporated into an edible material which contains an acid either normally found or used in such products, for example, citric, tartaric, adipic, fumaric or phosphoric acids, there is a very definite if not complete loss of the red hue of the dyestuff. Moreover, the shade will usually change and the coloring agent will precipitate from solution. The latter is particularly undesirable in foodstuffs and beverages where clarity is required, for example, gelatin desserts and carbonated beverages. The present invention provides a means of overcoming this undesirable decomposition of FD & C Red No. 3 when used in acid-containing foodstuffs and beverages by incorporating the color in the form of a stabilized solid solution consisting essentially of FD & C Red No. 3 and edible gelatin.

The high degree of acid stability of the novel FD & C Red No. 3-gelatin solid solutions of this invention permit them to be used in acid-containing edible materials while heretofore FD & C Red No. 3 per se could not be utilized. A particularly preferred use is the incorporation of a finely ground solid solution of gelatin and FD & C Red No. 3 as the coloring agent into commercial fruit-flavored gelatin dessert bases. Fruit-flavored gelatin desserts generally exhibit a pH of 4.1 or lower due to the presence of various acids, for example, citric acid. The red hue imparting solid solutions of gelatin and FD & C Red No. 3 may also be conveniently incorporated as the coloring agent into syrup concentrates used for the preparation of carbonated soft drinks. Still further, the instant gelatin-FD & C Red No. 3 solid solutions can be used to impart red shades to non-carbonated fruit-flavored beverages.

Although there are particular advantages related to the use of the novel gelatin-FD & C Red No. 3 solid solutions for imparting color to acid-containing edible materials, the subject solid solutions are equally usable in imparting color to food products having no acidic properties.

The concentration of FD & C Red No. 3 in the stabilized solid solutions is dependent upon the nature of the edible material being colored and the degree of red hue desired therein. Generally, it is preferred to utilize a solid solution containing approximately 0.1 to approximately 35 percent by weight of the solid solution of FD & C Red No. 3 to develop the particular red color desired. For deep coloring, such as in strawberry and cherry flavored edible materials, solid solutions containing approximately 25 to approximately 35 percent by weight of the solutions of FD & C Red No. 3 are preferred. More dilute gelatin-FD & C Red No. 3 solid solutions, that is, 0.1 percent to approximately 25 percent, may be incorporated in edible materials as toners to produce red shades of yellows and blues in foodstuffs.

To produce different shades of red hues in edible materials, other edible colorants, for example, FD & C Blue No. 1, FD & C Blue No. 2, FD & C Yellow No. 5 and FD & C Yellow No. 6 may be incorporated into the gelatin-FD & C Red No. 3 solid solutions. Thus, an excellent grape shade may be obtained by introducing FD & C Blue No. 1 with the FD & C Red No. 3 into the aqueous solution prepared in the first step of the process for obtaining the stabilized solid solutions of this invention. Similarly, orange shades can be obtained by introducing FD & C Yellow No. 5 or FD & C Yellow No. 6 colorants with the FD & C Red No. 3 in the first step.

The best mode contemplated by the inventor of carrying out this invention will now be described as to enable any person skilled in the art to which it pertains to make and use the same.

The novel stabilized solid solutions of this invention are prepared by adding with stirring an amount of edible gelatin equivalent to approximately 60 to 99.9 percent by weight of the desired final solid solution to sufficient hot water (90° to 100° C.) to completely dissolve the gelatin. The FD & C Red No. 3, in an amount equal to approximately 0.1 to 40 percent of the weight of the final solid solution, is then slowly added to the hot aqueous gelatin solution. After the FD & C Red No. 3 is dissolved, the resultant aqueous solution of gelatin and color is evaporated to dryness in a conventional manner, for example, in a vacuum or air oven, spray drier or drum drier. The residue, which is the stabilized solid solution of FD & C Red No. 3 and gelatin, is then comminuted to the desired particle size for incorporation in edible materials.

The thus obtained novel stabilized solid solutions consisting essentially of FD & C Red No. 3 and edible gelatin are incorporated into edible materials either in the finely divided powder form or alternatively as reconstituted aqueous solutions of the stabilized gelatin-FD & C Red No. 3 colorants. In the first instance, the powdered solid solutions are blended with uncolored dry mixes of edible materials, for example, commercial gelatin dessert mixes to impart the desired red hue to the dessert mix. The powdered solid solutions of gelatin and FD & C Red No. 3 of this invention can also be used to color simple syrup solutions additionally containing flavorings and other additives to prepare beverage concentrates of the type used by the soft drink industry.

An alternative mode of employing the stabilized solid solution colorants of this invention is effected by dissolving them in water (preferably hot water) at a specific weight ratio to form a solution, which, in turn, is added to liquid concentrates of edible materials, or to other forms of edible materials to produce the desired red hue.

The invention is further illustrated by the following procedures and examples which more explicitly set forth the details of the manner and process of making and using the invention, Said procedures and examples are given for the purpose of illustration only, and not to limit the invention thereto.

EXAMPLE 1

A. To 9080.0 ml of water, there was slowly added with stirring, 664.0 g of low Bloom gelatin and the mixture was heated at approximately 65° C. until the gelatin dissolved. Then, 227.0 g of FD & C Red No. 3 was slowly added to the warm aqueous gelatin solution and the mixture stirred until the dye was dissolved. The resulting solution was evaporated in vacuo at 80° C. The residual stabilized solid solution was ground in a hammer-mill comminuter. The thus obtained red powder was found, upon analysis, to have a 25.5 percent by weight content of FD & C Red No. 3.

B. Proceeding in a manner similar to that described in part A above, except that 268.3 g of FD & C Red No. 3 and 21.9 g of FD & C Blue No. 1 were dissolved in the water-gelatin solution, there was obtained a blue-red (grape) shade stabilized solid solution in the form of a powder which was found to contain 25.8 percent by weight of the mixed color.

EXAMPLE 2

A. With stirring, 890.0 g granulated sugar was added to 500.0 ml of distilled water and the mixture was heated at 48 to 52° C. until all the sugar dissolved. Sufficient distilled water was added to bring the volume to one liter. Then, 6.5 g of citric acid and 1.0 g of sodium benzoate were slowly added to the sugar solution and stirred until dissolved to obtain a citric acid-containing simple syrup.

B. Following the procedure described in part A above, except that 6.5 g of tartaric acid was substituted for the citric acid, a tartaric acid-containing simple syrup was prepared.

C. To 40.0 ml of the colorless citric acid-containing simple syrup from part A above in a pressure bottle, there was added 3.6 ml of a 1.0 percent aqueous solution of the powdered red shade solid solution from Example 1, part A above and 151.0 ml of carbonated water. The bottle was capped and the contents thoroughly mixed to obtain a red-colored carbonated beverage. After five days, the contents were evaluated for precipitation and the results are given in the table hereinbelow.

D. Following the procedure described in part C above, except that 1.0 ml of a 1.0 percent aqueous solution of FD & C Red No. 3 was substituted for the red shade gelatin-FD & C Red No. 3 solid solution of Example 1A to obtain a red-colored carbonated beverage. Results of the precipitation test are given below.

E. Proceeding in a manner similar to that described in part C above, except that 3.6 ml of a 1.0 percent aqueous solution of grape shade solid solution from Example 1, part B above was substituted for the red shade solid solution to obtain a grape-colored carbonated beverage. The five-day precipitation results are given in the table below.

F. In a manner similar to that described in part C above, except that a 1.0 percent aqueous solution of a mixture consisting of 92.6 percent FD & C Red No. 3 and 7.4 percent FD & C Blue No. 1 was substituted for the grape shade solid solution, a grape shade carbonated beverage was obtained. The results of the five-day precipitation test are given hereinbelow.

Duplicating the procedures described in parts C, D, E and F above, except that the tartaric acid-containing simple syrup of Example 1, part B above was substituted for the citric acid-containing simple syrup of Example 1, part A used in those examples, four corresponding carbonated beverages (Examples 2G-2J) were prepared. The results of the five-day precipitation tests are given below.

| | CARBONATED BEVERAGES | | | | |
|---|---|---|---|---|---|
| | | | | Observation After 5 Days | |
| Ex. No. | Acid | pH | Shade | Precipitation | Percent of Orig. Color Value |
| 2-C | Citric | 3.8 | Red | None | 100 |
| 2-D | Citric | 3.8 | Red | Moderate | 50 |
| 2-E | Citric | 3.8 | Grape | None | 100 |
| 2-F | Citric | 3.8 | Grape | Moderate | 50 |
| 2-G | Tartaric | 3.7 | Red | None | 100 |
| 2-H | Tartaric | 3.7 | Red | Moderate | 50 |
| 2-I | Tartaric | 3.7 | Grape | None | 100 |
| 2-J | Tartaric | 3.7 | Grape | Moderate | 70 |

Comparison of the data in the table above shows that when FD & C Red No. 3 or mixtures of FD & C Red No. 3 and FD & C Blue No. 1 are combined with aqueous solutions of acids, namely, citric and tartaric acids, and the solutions carbonated to manufacture a carbonated beverage (Examples 2-D, 2-F, 2-H and 2-J), there is an appreciable loss of color with concomitant precipitation of substantial amounts of dyestuff after five days of standing; but when gelatin solid solutions of FD & C Red No. 3 or mixtures of FD & C Red No. 3 and FD & C Blue No. 1 are added to equivalent aqueous solutions of the same acids and the solutions carbonated (Examples 2-C, 2-E, 2-G and 2-I), there is essentially no loss in color and no precipitation of the dyestuff occurs after five days of standing.

EXAMPLE 3

A mixture of 45.5 g of uncolored commercial gelatin dessert base and 0.08 g of gelatin-FD & C Red No. 3 solid solution containing 25.5 percent FD & C Red No. 3, obtained from Example 1, part A above, was dissolved in 118.5 ml of water at 90°–95° C. with stirring for approximately two minutes. Then, 118.5 ml of cold water was added and stirring continued for approximately fifteen seconds. No particulate matter was observed in the essentially clear, red solution.

EXAMPLE 4

A. To 580 g of granulated sugar, there was added sufficient water to make one liter of sugar solution. When all the sugar was dissolved, 5.6 g of citric acid was added and the mixture stirred to dissolve the citric acid.

B. To 67.7 g of the concentrated citric acid-containing sugar syrup from part A above, was added 1.1 g of uncolored concentrated commercial grape extract and sufficient water to dilute the solution to 270.8 ml.

C. Ten grams of the gelatin-FD & C Red No. 3-stabilized solid solution, from Example 1, part A above, was dissolved in 90.0 g of hot water and cooled to ambient temperature.

D. To 50.0 ml of the uncolored syrup prepared in part B, directly above warmed to 60°–65° C., there was added 0.3 ml of the 10 percent aqueous solution of the stabilized FD & C Red No. 3-gelatin solid solution from part C above and 0.6 ml of a 0.1 percent solution of FD & C Blue No. 1 in water to obtain a grape-colored noncarbonated beverage free of precipitates and which retained the full original color value on storage at ambient temperature during a ten-day test period.

EXAMPLE 5

With stirring, 178.3 g of low Bloom gelatin was rapidly added to 416.0 ml of cold tap water and then set aside without agitation for approximately one-half hour at ambient temperature. The gelatin-water mixture was heated at a temperature in the range of 55° C. to 60° C. for approximately one-half hour to effect solution. A solution consisting of 21.7 g of FD & C Red No. 3 in 195.3 ml of water was heated at approximately 65° C. for one-half hour and was then slowly added with stirring to the gelatin-water solution. After stirring for approximately one-half hour, the resulting solution was passed through a 325 mesh sieve to remove any large agglomerates. The screened solution was then evaporated to dryness in vacuo. The resulting solid solution of FD & C Red No. 3 in gelatin was then ground through a 3/64" screen. Analysis of the powder showed it to have a color content of 10.8 percent by weight.

In a similar manner, a second solid solution was prepared substituting a medium Bloom, Type A gelatin for the low Bloom gelatin employed above.

EXAMPLE 6

A.-1 With stirring, 1.41 ml of a 1.0 percent aqueous solution of FD & C Red No. 3 was diluted with 110.6 ml of distilled water at approximately 60° C. To the dilute dye solution there was slowly added 0.33 g of citric acid and after stirring for approximately ten minutes, the mixture was cooled to ambient temperature.

The above procedure was repeated substituting tartaric, adipic, fumaric and phosphoric acids for the citric acid.

Each solution was observed immediately after cooling and after approximately one hundred hours of standing for precipitation. The observations are listed below.

| Ex. No. | Acid | pH | Observations Immediate Precipitate* | After 100 Hours Precipitate* |
|---|---|---|---|---|
| 6-A-1 | Citric | 3.2 | Trace | Slight |
| 6-A-2 | Tartaric | 3.5 | None | 95% |
| 6-A-3 | Adipic | 4.5 | None | 95% |
| 6-A-4 | Fumeric | 3.5 | None | 95% |
| 6-A-5 | Phosphoric | 3.1 | 100% | 100% |

*The amount of precipitate was estimated from the amount of FD & C Red No. 3 remaining in solution.

B. Following the procedure described in part A-1 above, except that 0.133 g of low Bloom gelatin was dissolved in the hot water before the color was added, the following observations were made:

| Ex. No. | Acid | pH | Observations Immediate Precipitate | After 100 Hours Precipitate |
|---|---|---|---|---|
| 6-B-1 | Citric | 3.6 | None | None |
| 6-B-2 | Tartaric | 3.4 | None | None |
| 6-B-3 | Adipic | 4.2 | None | None |
| 6-B-4 | Fumaric | 3.3 | None | None |
| 6-B-5 | Phosphoric | 3.0 | None | None |

Comparison of the data in the two tables above shows that when FD & C Red No. 3 is combined alone with aqueous solutions of acids which are widely found in various foodstuffs, namely, citric acid, tartaric acid, adipic acid, fumaric acid and phosphoric acid, said acids having a pH of 4.5 or less, there is an appreciable loss of color with concomitant precipitation of substantial amounts of the dyestuff after 100 hours of standing but that when the FD & C Red No. 3 is added to equivalent aqueous solutions of the same acids which additionally contain gelatin, there is essentially no loss in color and no precipitation of the dyestuff occurs after 100 hours standing.

EXAMPLE 7

A. Five solutions, each obtained by dissolving 1.33 g of gelatin in 110.6 ml of water with stirring and slowly adding 1.41 ml of a 1.0 percent aqueous solution of FD & C Red No. 3 were prepared. To each of the solutions there was slowly added 0.33 g of one of the acids shown in the table directly below. The appearance of each solution was observed after eighteen hours of standing at ambient temperature.

| Example No. | Acid | Physical Appearance | Precipitation |
|---|---|---|---|
| 7-A-1 | Citric | Clear | None |
| 7-A-2 | Tartaric | Clear | None |
| 7-A-3 | Adipic | Clear | None |
| 7-A-4 | Fumaric | Clear | None |
| 7-A-5 | Phosphoric | Clear | None |

B. Five solutions, each obtained by first dissolving 1.33 g of gelatin in 110.6 ml of water with stirring and then 0.33 g of one of the acids listed in the table directly below to each of the solutions, were prepared. To each of these solutions there was slowly added 1.41 ml of a 1.0 percent aqueous solution of FD & C Red No. 3. The appearance of each solution was observed after eighteen hours of standing at ambient temperature.

| Example No. | Acid | Physical Appearance | Precipitation |
|---|---|---|---|
| 7-B-1 | Citric | Hazy | Slight |
| 7-B-2 | Tartaric | Hazy | Slight |
| 7-B-3 | Adipic | Hazy | Slight |
| 7-B-4 | Fumaric | Hazy | Slight |
| 7-B-5 | Phosphoric | Hazy | Slight |

Comparison of the data listed in the two tables above shows that optimum results (Examples 7-A-1 through 7-A-5) are obtained in solution systems with regard to retention of color and precipitation of the dyestuff when the acidic substituent is added to a solution in which the gelatin and FD & C Red No. 3 have been precombined vis a vis adding the FD & C Red No. 3 to a solution in which the gelatin and acid have been precombined.

EXAMPLE 8

A. With stirring, 19.0 g of gelatin and 1.1 g of FD & C Red No. 3 were dissolved in 112 ml of hot water. The solution was initially evaporated in vacuo at 60° C. for approximately eighteen hours and then for approximately twenty-four hours at 60° C. at ambient pressure in an oven. The resulting stabilized solid solution was ground to a fine powder which on assay was found to contain 5 percent by weight of FD & C Red No. 3.

Following the procedure described directly above but using the amounts of gelatin and FD & C Red No. 3 indicated, the following stabilized solid solutions of FD & C Red No. 3 in gelatin were prepared:

| Ex. No. | Wt. of FD & C Red No. 3 | Wt. of Gelatin | FD & C Red No. 3 Assay (by wt.) |
|---|---|---|---|
| 8-B | 2.0 g | 18.0 g | 10% |
| 8-C | 1.1 g | 15.0 g | 25% |
| 8-D | 7.0 g | 13.0 g | 35% |

| Ex. No. | Wt. of FD & C Red No. 3 | Wt. of Gelatin | FD & C Red No. 3 Assay (by wt.) |
|---|---|---|---|
| 8-E | 8.0 g | 12.0 g | 40% |

EXAMPLE 9

Proceeding in a manner similar to that described in Example 1, part B, except that 11.0 g of FD & C Red No. 3 and 134.2 g of FD & C Yellow No. 5 and 399.8 g of gelatin are dissolved in 4540 g of water. The solution is evaporated to dryness and the dried residue comminuted to obtain as a powder a stabilized solid solution of FD & C Red No. 3 having an orange shade.

What I claim is:

1. A method of imparting a red hue to edible acidic materials which comprises incorporating into said edible acidic materials, in an amount effective to impart red hue thereto as a coloring agent, a stabilized solid solution consisting essentially of 0.1 to 40 percent by weight of FD & C Red No. 3 and 99.9 to 60 percent by weight of edible gelatin, said solid solution optionally containing sufficient amounts of edible colorants selected from the group consisting of FD & C Blue No. 1, FD & C Blue No. 2, FD & C Yellow No. 5 and FD & C Yellow No. 6 to impart a desired shade of red hue to said edible acidic materials.

2. A stabilized solid solution as a coloring agent for imparting a red hue to edible acidic materials consisting essentially of 0.1 to 40 percent by weight of FD & C Red No. 3 and 99.9 to 60 percent by weight of edible gelatin, said solid solution optionally containing sufficient amounts of edible colorants selected from the group consisting of FD & C Blue No. 1, FD & C Blue No. 2, FD & C Yellow No. 5 and FD & C Yellow No. 6 to impart a desired shade of red hue to said edible acidic materials.

3. A stabilized solid solution according to claim 2 consisting essentially of 0.1 to 30 percent by weight of FD & C Red No. 3 and 99.9 to 70 percent by weight of edible gelatin.

4. A stabilized solid solution according to claim 2 consisting essentially of 0.1 to 30 percent by weight of FD & C Red No. 3, 0.1 to 5 percent by weight of FD & C Blue No. 1 and 99.8 to 65 percent by weight of edible gelatin.

5. A colored edible acidic material which comprises the edible acidic material and as a coloring agent a stabilized solid solution consisting essentially of 0.1 to 40 percent by weight of FD & C Red No. 3 and from 99.9 to 60 percent by weight of edible gelatin, said solid solution optionally containing sufficient amounts of edible colorants selected from the group consisting of FD & C Blue No. 1, FD & C Blue No. 2, FD & C Yellow No. 5 and FD & C Yellow No. 6 to impart a desired shade of red hue to said edible acidic material.

6. The edible acidic material of claim 5 wherein the edible acidic material is a gelatin dessert.

7. The edible acidic material of claim 5 wherein the edible acidic material is a carbonated or non-carbonated beverage.

8. The beverage of claim 7 wherein the beverage is carbonated.

9. The beverage of claim 7 wherein the beverage is non-carbonated.

10. A process for preparing a stabilized solid solution consisting essentially of 0.1 to 40 percent by weight of FD & C Red No. 3 and 99.9 to 60 percent by weight of edible gelatin, said solid solution optionally containing sufficient amounts of edible colorants selected from the group consisting of FD & C Blue No. 1, FD & C Blue No. 2, FD & C Yellow No. 5 and FD & C Yellow No. 6 to impart a desired shade of red hue to said edible acidic materials which comprises:
   (a) dissolving the edible gelatin in water;
   (b) dissolving the FD & C Red No. 3 and optionally one or more of the other shade-imparting edible colorants in the gelatin-water solution;
   (c) evaporating the water from the gelatin-FD & C Red No. 3-water solution; and
   (d) comminuting the residual gelatin-FD & C Red No. 3 solid solution to the desired particle size.

* * * * *

Disclaimer 4,139,645.—*Raymond E. Werner*, Cincinnati, Ohio COLORING AGENTS FOR EDIBLE MATERIALS. Patent dated Feb. 13, 1979. Disclaimer filed Apr. 7, 1981, by the assigne, *Sterling Drug, Inc.*

Hereby enters this disclaimer to claims 1 to 6 inclusive, and claim 10 of said patent.

[*Official Gazette August 4, 1981.*]